(12) United States Patent
Tada et al.

(10) Patent No.: US 8,166,826 B2
(45) Date of Patent: May 1, 2012

(54) VIBRATION CHARACTERISTIC MEASURING DEVICE

(75) Inventors: Hajime Tada, Yokohama (JP); Mikio Arai, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 553 days.

(21) Appl. No.: 12/398,419

(22) Filed: Mar. 5, 2009

(65) Prior Publication Data
US 2009/0223297 A1    Sep. 10, 2009

(30) Foreign Application Priority Data
Mar. 7, 2008  (JP) .................................. 2008-058361

(51) Int. Cl.
*G01M 7/02* (2006.01)
(52) U.S. Cl. .......................................................... 73/663
(58) Field of Classification Search .................. 73/662, 73/663, 668
See application file for complete search history.

(56) References Cited

U.S. PATENT DOCUMENTS

| 4,495,433 | A  | * | 1/1985 | Sheridan | 310/329 |
| 4,827,771 | A  | * | 5/1989 | Cary et al. | 73/644 |
| 2007/0169556 | A1 | * | 7/2007 | Hanya et al. | 73/662 |
| 2009/0086375 | A1 | * | 4/2009 | Hanya et al. | 360/245.3 |

FOREIGN PATENT DOCUMENTS
JP    2007-192735 A    8/2007
* cited by examiner

*Primary Examiner* — John Chapman, Jr.
(74) *Attorney, Agent, or Firm* — Holtz, Holtz, Goodman & Chick, PC

(57) ABSTRACT

A vibration characteristic measuring device is provided with a shaker, including a shaking section which reciprocates along an axis, and a mounting block fastened to a mounting surface of the shaking section. A disk drive suspension is mounted on the mounting block. The mounting block has a facing surface which faces the mounting surface of the shaking section. An adhesive member formed of a resin tape is disposed between the mounting surface and the facing surface of the mounting block. The adhesive member is deformable depending on a gap between the mounting surface and the facing surface. The adhesive member closely contacts both the mounting surface and the facing surface without a gap.

4 Claims, 9 Drawing Sheets

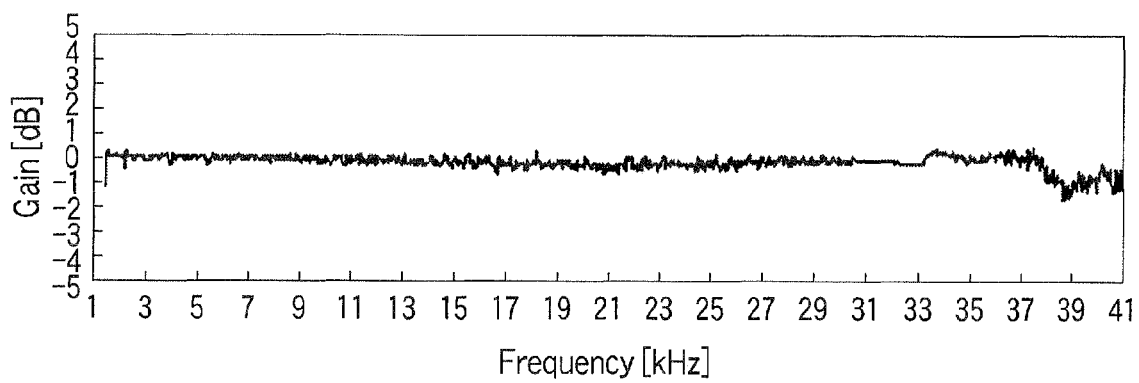
F I G. 4
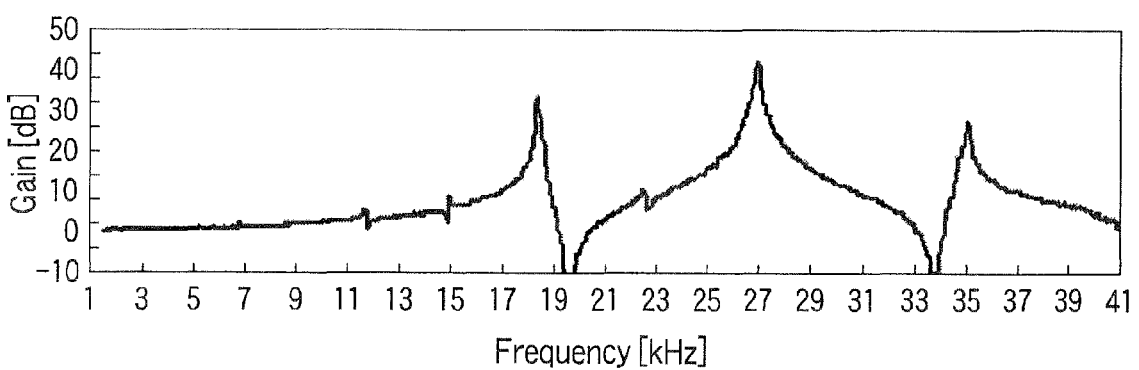
F I G. 5
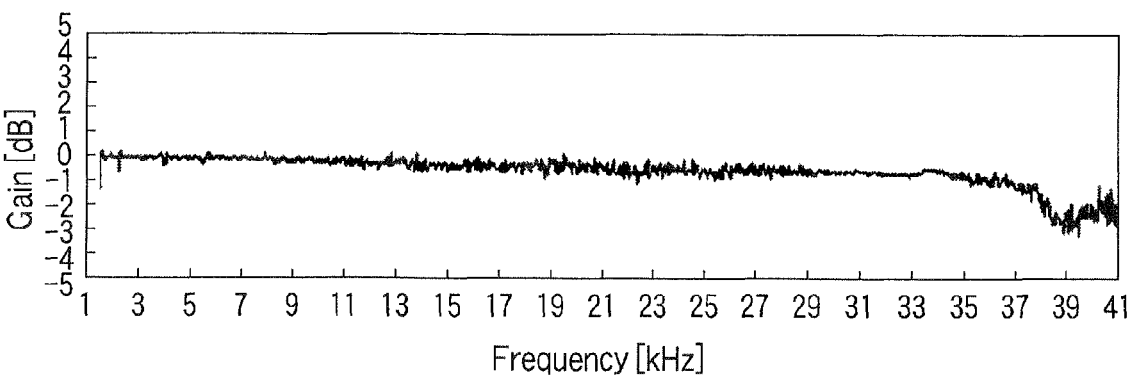
F I G. 6

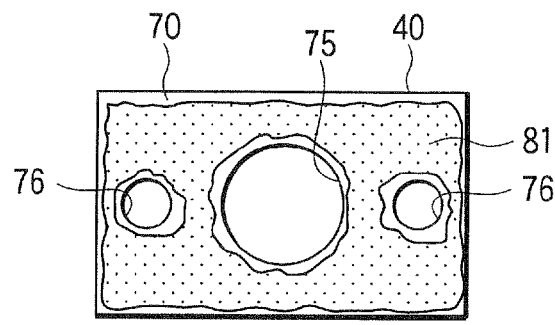
F I G. 7
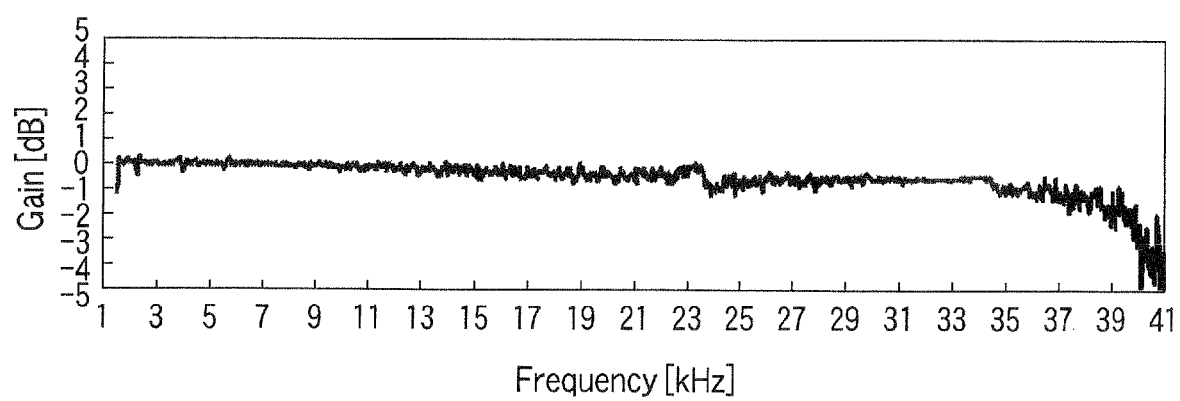
F I G. 8

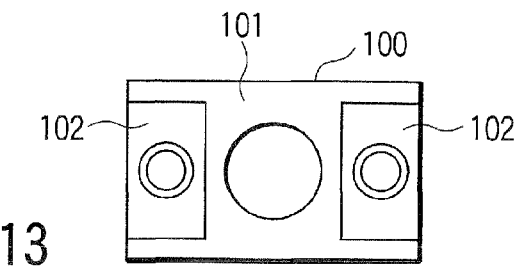
F I G. 13
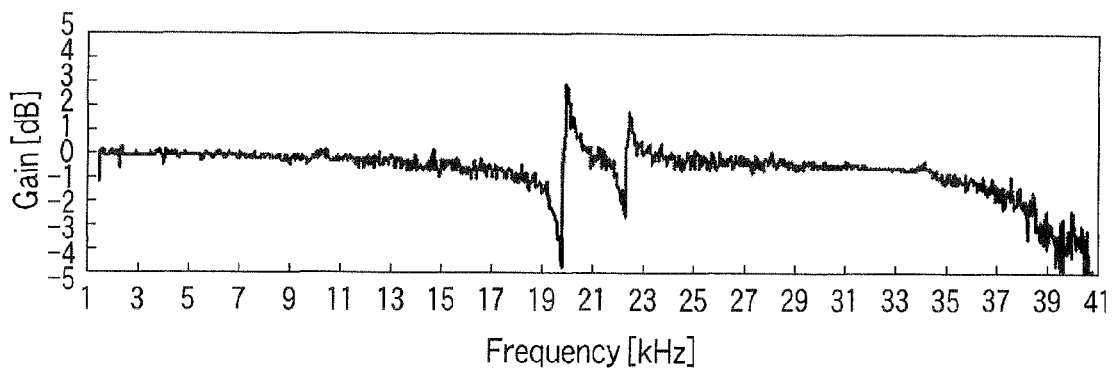
F I G. 14
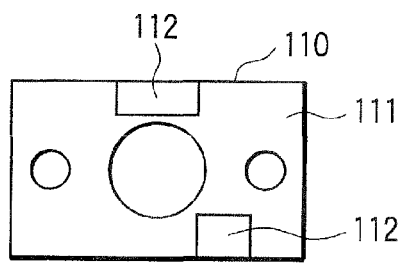
F I G. 15
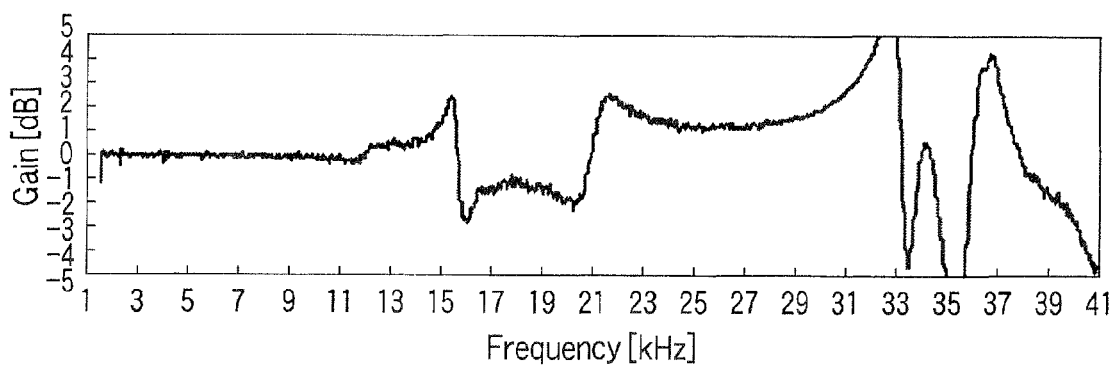
F I G. 16

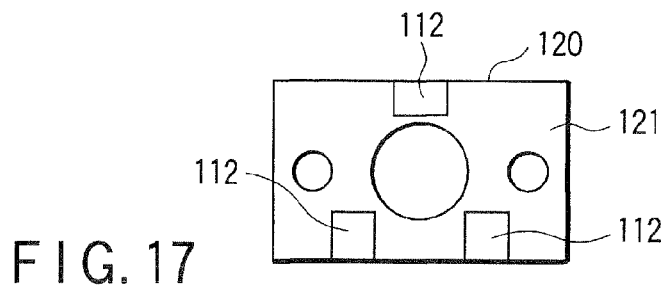
F I G. 17
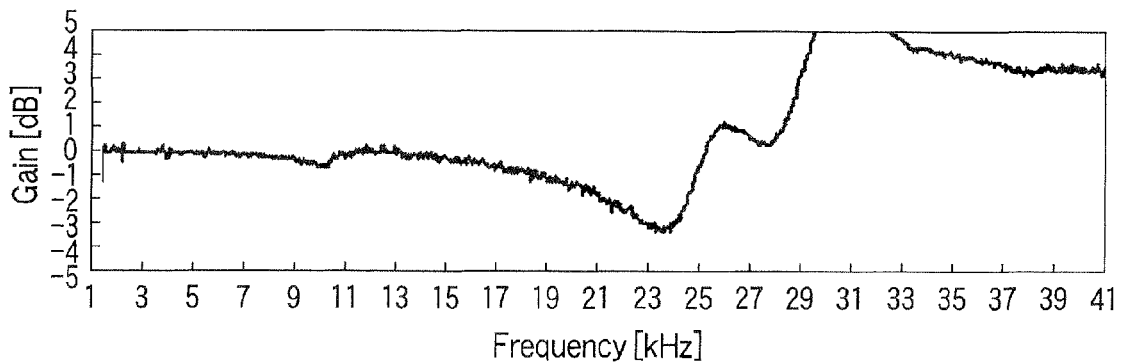
F I G. 18
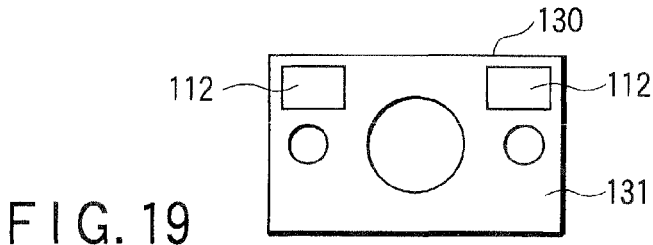
F I G. 19
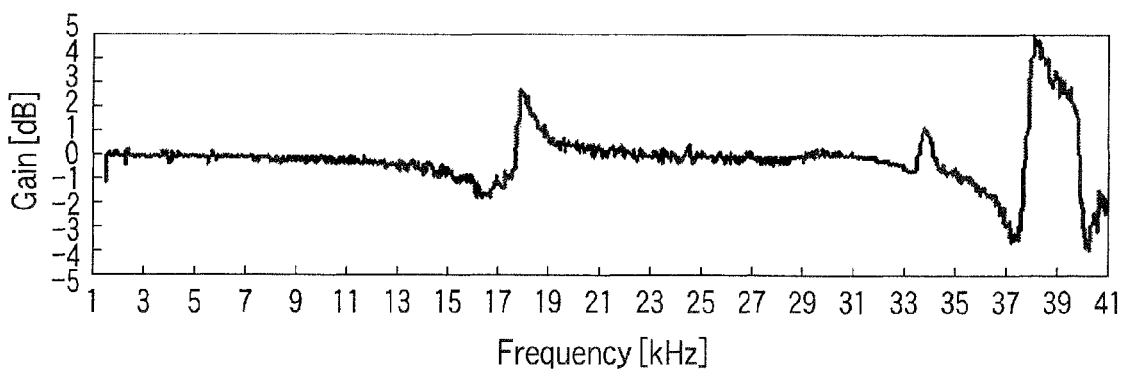
F I G. 20

VIBRATION CHARACTERISTIC MEASURING DEVICE

CROSS-REFERENCE TO RELATED APPLICATIONS

This application is based upon and claims the benefit of priority from prior Japanese Patent Application No. 2008-058361, filed Mar. 7, 2008, the entire contents of which are incorporated herein by reference.

BACKGROUND OF THE INVENTION

1. Field of the Invention

This invention relates to a vibration characteristic measuring device adapted to measure the vibration characteristic of, for example, a disk drive suspension.

2. Description of the Related Art

A hard disk drive (HDD) is known as a device for accessing data stored in a rotating magnetic disk. A disk drive suspension (hereinafter referred to simply as the suspension) is used for the HDD. A slider is disposed on the distal end portion of the suspension. The slider is provided with a transducer for reading or writing data.

A vibration characteristic measuring device is used to analyze the vibration characteristic of the suspension. As described in, for example, Jpn. Pat. Appln. KOKAI Publication No. 2007-192735 (Patent Document 1), the vibration characteristic measuring device is provided with a laser Doppler vibrometer (LDV). The measuring device disclosed in Patent Document 1 includes a shaker and a metallic mounting block. The shaker includes a shaking section that is reciprocated by an actuator. The mounting block is fixed to a mounting surface of the shaking section. The mounting block is fastened to the mounting surface of the shaking section by a screw member. The suspension to be measured is mounted on the mounting block.

The suspension is mounted on the mounting block. Further, the mounting block is fixed to the shaking section of the shaker by the screw member. The suspension vibrates as the mounting block in this state is shaken at a predetermined frequency by the shaker. The vibration of a slider or the like of the suspension is detected by the LDV. In some cases, vibration modes may appear in a measured waveform obtained in this manner.

FIG. 25 shows a frequency response characteristic (transfer function) of a mounting block of a conventional vibration characteristic measuring device. FIG. 26 shows a frequency response characteristic of a slider of a suspension attached to this mounting block. In FIGS. 25 and 26, the abscissa and ordinate represent frequency and gain (equivalent to amplitude), respectively. In either of FIGS. 25 and 26, the waveform is severely disturbed near a specific frequency (e.g., 26 kHz).

This waveform disturbance is caused by a vibration mode attributable to a resonance of the mounting block. If a vibration mode M appears in a measured waveform of the mounting block, as shown in FIG. 25, a vibration mode M' also appears in a measured waveform of the suspension, as shown in FIG. 26. These vibration modes hinder an analysis of the vibration characteristic of the suspension. Thus, the vibration mode of the mounting block is expected to be prevented from appearing in the measured waveform of the suspension.

BRIEF SUMMARY OF THE INVENTION

The present invention provides a vibration characteristic measuring device capable of suppressing the appearance of a vibration mode of a mounting block in a measured waveform.

The invention is a vibration characteristic measuring device, which comprises a shaker including a shaking section which reciprocates along an axis, a mounting block fastened along the axis to a mounting surface of the shaking section by a fixing member and including a workpiece mounting portion configured to be mounted with a disk drive suspension, and a sensor which detects a vibration of the suspension mounted on the workpiece mounting portion. In this measuring device, the mounting block has a facing surface which faces the mounting surface of the shaking section. The measuring device comprises an adhesive member which is deformable when sandwiched between the mounting surface and the facing surface and closely contacts both the mounting surface and the facing surface without a gap with the mounting block fastened to the mounting surface by the fixing member. According to this arrangement, a vibration mode of the mounting block can be prevented from influencing a measured waveform of the suspension, so that the vibration characteristic of the suspension can be analyzed more accurately.

In a preferred aspect of the invention, the facing surface of the mounting block is square, and the adhesive member is formed of an adhesive-coated resin tape, which is affixed to the vicinities of four corners (or inside the four corners) of the facing surface. The adhesive member may be formed of a resin tape, which is fused to the vicinities of four corners (or inside the four corners) of the facing surface. In another aspect of the invention, the adhesive member is formed of grease, which is applied to the facing surface of the mounting block. In a further aspect of the invention, a through-hole extending along the axis opens in the center of the facing surface of the mounting block, a male screw member for use as the fixing member is inserted into the through-hole, and the mounting block is fastened to the mounting surface of the shaking section by the male screw member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a diagram showing a frequency response characteristic of the mounting block shown in FIG. 2;

FIG. 5 is a diagram showing a frequency response characteristic of a suspension attached to the mounting block shown in FIG. 2;

FIG. 6 is a diagram showing a frequency response characteristic of a mounting block according to a second embodiment of the invention;

FIG. 7 is a rear view of a mounting block according to a third embodiment of the invention;

FIG. 8 is a diagram showing a frequency response characteristic of the mounting block shown in FIG. 7;

FIG. 13 is a rear view of a mounting block of a third comparative example;

FIG. 14 is a diagram showing a frequency response characteristic of the mounting block shown in FIG. 13;

FIG. 15 is a rear view of a mounting block of a fourth comparative example;

FIG. 16 is a diagram showing a frequency response characteristic of the mounting block shown in FIG. 15;

FIG. 17 is a rear view of a mounting block of a fifth comparative example;

FIG. 18 is a diagram showing a frequency response characteristic of the mounting block shown in FIG. 17;

FIG. 19 is a rear view of a mounting block of a sixth comparative example;

FIG. 20 is a diagram showing a frequency response characteristic of the mounting block shown in FIG. 19;

DETAILED DESCRIPTION OF THE INVENTION

A first embodiment of the present invention will now be described with reference to FIGS. 1 to 5.

Figure 1:
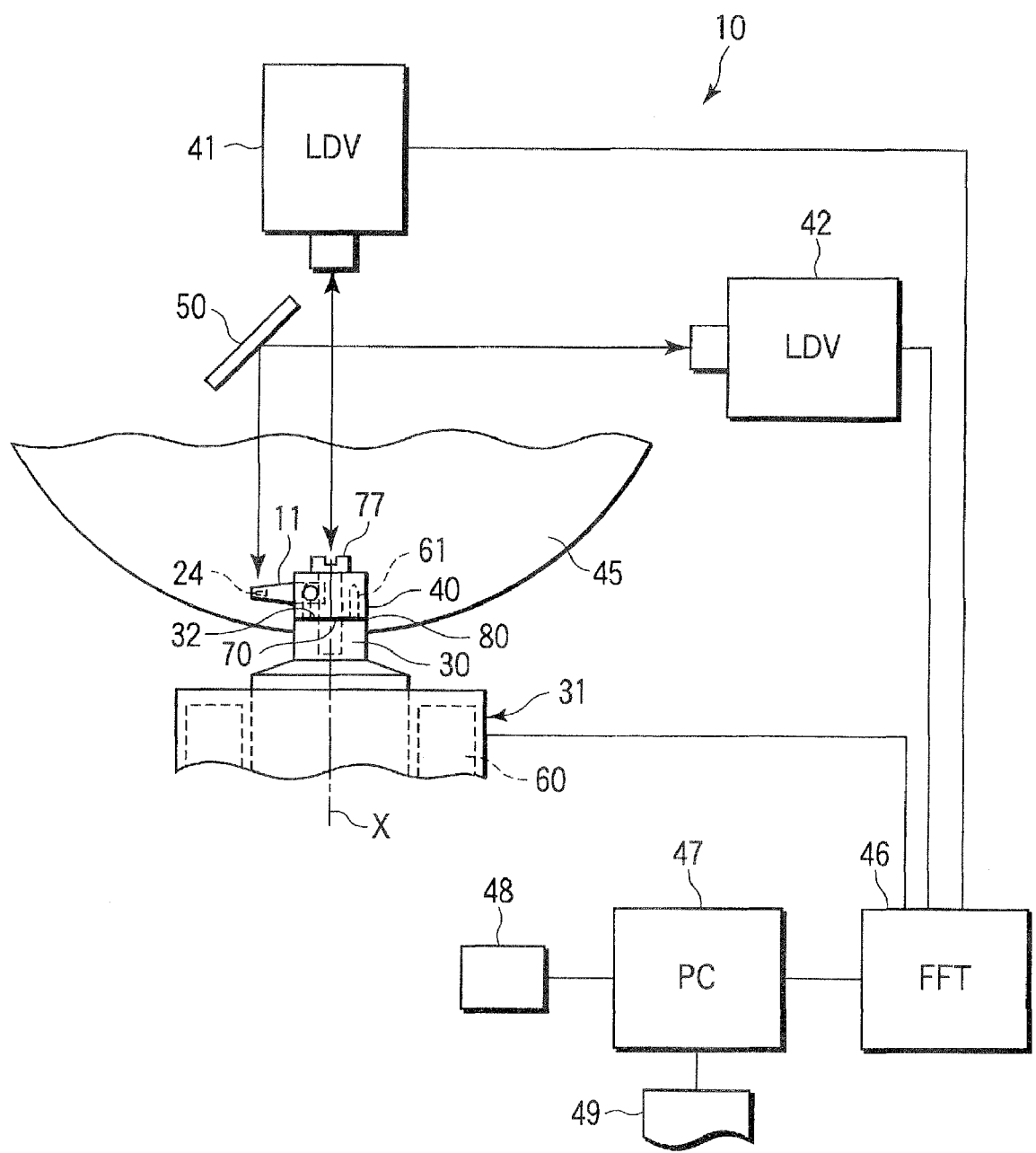
FIG. 1 is a plan view showing a part of a vibration characteristic measuring device according to a first embodiment of the invention.

A vibration characteristic measuring device 10 shown in FIG. 1 is used to measure the vibration characteristic of a disk drive suspension (hereinafter referred to simply as the suspension) 11. It can also measure the vibration characteristic of any other workpiece than the suspension 11.

Figure 2:
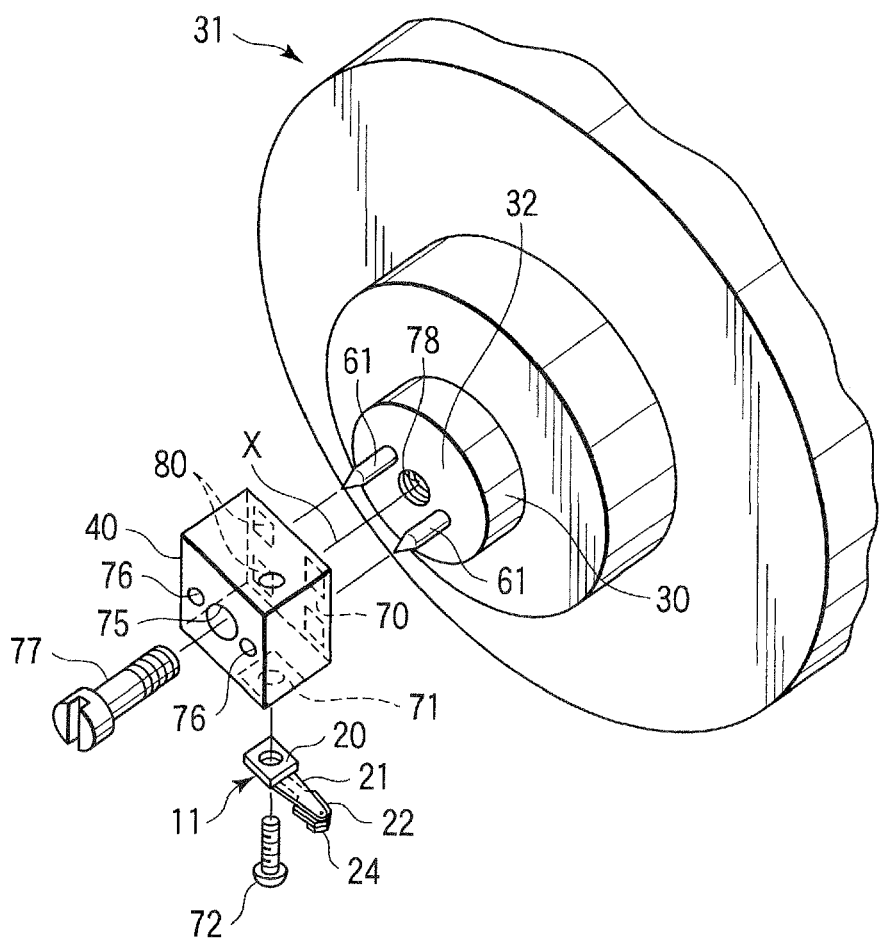
FIG. 2 is an exploded perspective view of the vibration characteristic measuring device shown in FIG. 1 with its mounting block removed from a shaker.

FIG. 2 shows the suspension 11 as an example of a workpiece. The suspension 11 is provided with a base portion 20 including a baseplate, a load beam 21 fixed to the base portion 20, a flexure 22 superposed on the load beam 21, a slider 24 mounted on the distal end portion of the flexure 22, etc.

The vibration characteristic measuring device 10 includes a shaker 31, mounting block 40, first sensor 41, second sensor 42, and disk 45. It also includes an analyzing section 46, such as an FFT analyzer, and a control section 47 that uses a personal computer or the like. The shaker 31 includes a shaking section 30 that is movable along an axis X. The mounting block 40 is fixed to a mounting surface 32 at the distal end of the shaking section 30. The control section 47 is connected with a display section 48 capable of displaying a measured waveform and the like and a printing section 49 that outputs a measurement result and the like. The disk 45 is rotated around a vertical axis by a motor (not shown).

The first and second sensors 41 and 42 are laser Doppler vibrometers (LDVs), for example. The first sensor 41 detects a vibration of the mounting block 40 and outputs its detection signal to the analyzing section 46. The second sensor 42 detects a vibration of the slider 24 of the suspension 11 via a mirror 50 and outputs its detection signal to the analyzing section 46.

The shaker 31 includes an actuator 60 (typically shown in FIG. 1). The actuator 60 reciprocates the shaking section 30 along the axis X. The actuator 60 is formed of, for example, a voice coil that can be controlled by the control section 47. The actuator 60 drives the shaking section 30 at a predetermined desired vibration frequency. The mounting surface 32 of the shaking section 30 is in a flat shape. The mounting surface 32 is provided with a pair of positioning pins 61. The pins 61 project horizontally and extend along the axis X.

Figure 3:
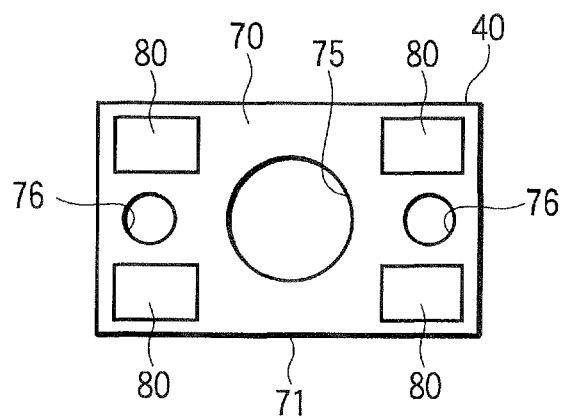
FIG. 3 is a rear view of the mounting block shown in FIG. 2.

The mounting block 40 is formed of a metal, such as stainless steel or titanium alloy. The mounting block 40 has a facing surface 70 that faces the mounting surface 32 of the shaking section 30. As shown in FIG. 3, the facing surface 70 is in a square (or rectangular), flat shape. A workpiece mounting portion 71 is formed on the lower surface of the mounting block 40. The base portion 20 of the suspension 11 is fixed to the workpiece mounting portion 71 by a screw member 72.

The mounting block 40 is formed with a through-hole 75 that extends along the axis X. Pin insertion holes 76 are formed individually on the opposite sides of the through-hole 75. The positioning pins 61 are inserted along the axis X into the pin insertion holes 76, individually. A male screw member (bolt) 77 as an example of a fixing member is inserted into the through-hole 75 of the mounting block 40. The male screw member 77 is inserted into the through-hole 75, and its distal end portion is screwed into a threaded hole 78 of the shaking section 30. The mounting block 40 is fastened along the axis X to the mounting surface 32 of the shaking section 30 by the male screw member 77.

Adhesive members 80 shown in FIG. 3 are interposed between the mounting surface 32 of the shaking section 30 and the facing surface 70 of the mounting block 40. An example of each adhesive member 80 is an adhesive-coated resin tape of polyimide with a thickness of about 50 μm. The adhesive members 80 are affixed individually to the vicinities of the four corners (or inside the four corners) of the facing surface 70 of the mounting block 40. Specifically, the four adhesive members 80 are located with a good balance in positions laterally and vertically symmetrical with respect to the through-hole 75. Thermoplastic resin tapes may be used as the adhesive members 80. These resin tapes can be stuck to the vicinities of the four corners of the mounting surface 32 if they are heated and melted.

The adhesive members 80 are interposed between the mounting surface 32 of the shaking section 30 and the facing surface 70 of the mounting block 40. The mounting block 40 is fixed to the shaking section 30 by the male screw member 77. Thus, the adhesive members 80 are sandwiched and compressed along their thickness between the mounting surface 32 and the facing surface 70. As the adhesive members 80 are deformed depending on a gap between the mounting surface 32 of the shaking section 30 and the facing surface 70 of the mounting block 40, they can closely contact both the mounting surface 32 and the facing surface 70 without a gap.

The following is a description of the operation of the vibration characteristic measuring device 10.

The shaking section 30 of the shaker 31 is vibrated at a desired frequency along the axis X by the actuator 60. This vibration is transmitted to the suspension 11 through the mounting block 40. Thus, the suspension 11 vibrates along the axis X, while the slider 24 vibrates transversely.

The vibration of the mounting block 40 is measured by the first sensor 41. The vibration of the slider 24 is measured by the second sensor 42. Signals output from the sensors 41 and 42 are delivered to and processed by the analyzing section 46. A measured waveform such as the one shown in FIG. 4 can be obtained by this processing. This waveform represents a transfer function associated with a frequency response characteristic. This waveform is displayed by the display section 48 or the printing section 49. A measured waveform (not shown) that represents a phase change for each frequency can also be obtained based on the signals output from sensors 41 and 42.

FIG. 4 represents the frequency response characteristic of the mounting block 40. FIG. 5 represents the frequency response characteristic of the slider 24. In the present embodiment, the aforesaid adhesive members 80 are interposed between the mounting surface 32 of the shaking section 30 and the facing surface 70 of the mounting block 40. Accordingly, a measured waveform (shown in FIG. 4) of the mounting block 40 is substantially flat and suffers no considerable disturbance. As shown in FIG. 5, moreover, a measured waveform of the slider 24 does not include the vibration mode of the mounting block. Thus, the vibration of the suspension 11 can be analyzed more accurately.

Figure 25:
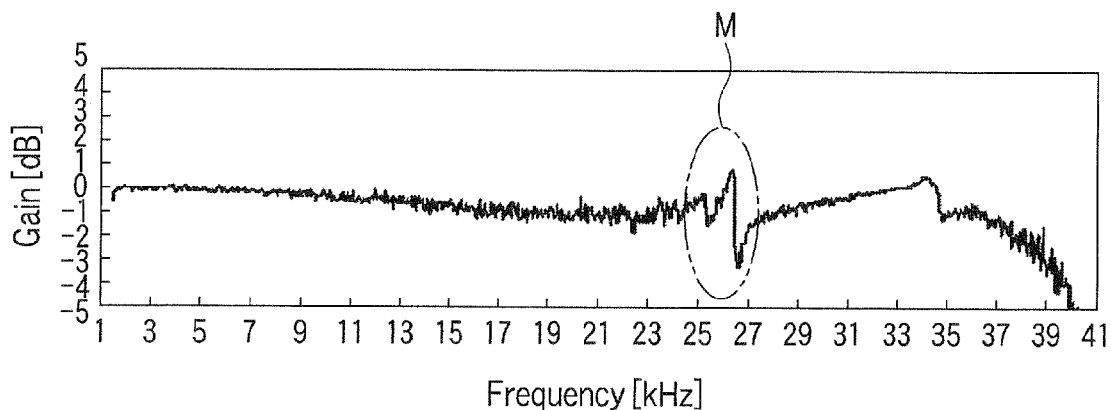
FIG. 25 is a diagram showing a frequency response characteristic of a mounting block of a conventional vibration characteristic measuring device.
Figure 26:
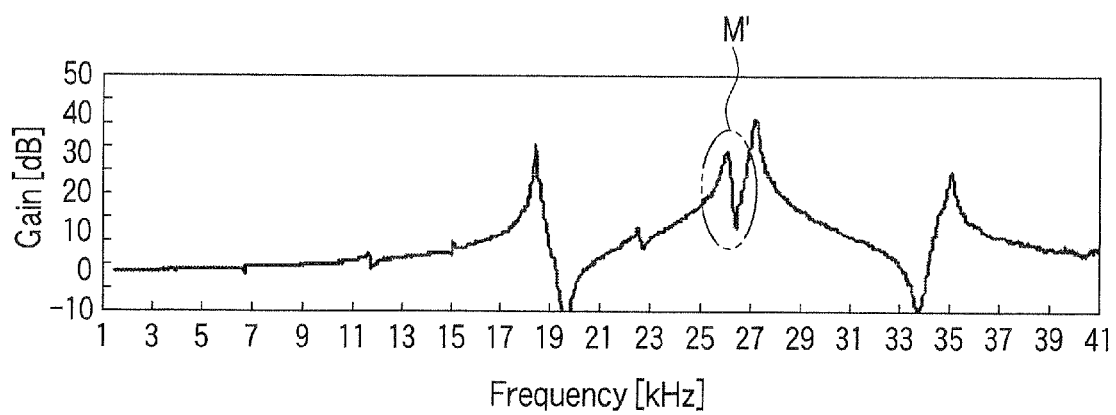
FIG. 26 is a diagram showing a frequency response characteristic of a suspension attached to the conventional mounting block.

On the other hand, the conventional measured waveforms shown in FIGS. 25 and 26 include the vibration mode M' of the mounting block. This vibration mode M' is undesirable because it hinders an accurate analysis of the vibration of the suspension.

FIG. 6 shows a frequency response characteristic of a mounting block according to a second embodiment of the invention. In this embodiment, an adhesive-coated resin tape (Cellotape, trademark) based on a regenerated cellulose film with a thickness of about 50 μm is used for each adhesive member 80. As shown in FIG. 3, these resin tapes are affixed individually to the vicinities of the four corners of a facing surface 70 of a mounting block 40. Other configurations are the same as those of the first embodiment. FIG. 6 shows the frequency response characteristic according to the second embodiment. The illustrated waveform is substantially flat and suffers no considerable disturbance.

FIG. 7 shows a mounting block 40 according to a third embodiment of the invention. In this embodiment, an adhesive member 81 formed of grease is applied to substantially the entire area of a facing surface 70 of the mounting block 40. Other configurations are the same as those of the first embodiment. The grease or adhesive member 81 flows depending on a gap between a mounting surface 32 of a shaking section 30 and the facing surface 70 of the mounting block 40. Therefore, the adhesive member 81 can closely contact both the mounting surface 32 and the facing surface 70 without a gap. FIG. 8 shows a frequency response characteristic according to the third embodiment. The illustrated waveform is substantially flat and suffers no considerable disturbance. Any other oil than grease may be used for the adhesive member 81.

Figure 9:
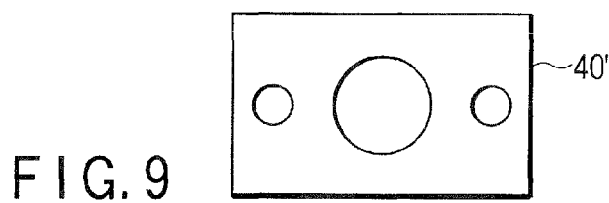
FIG. 9 is a rear view of a mounting block of a first comparative example.
Figure 10:
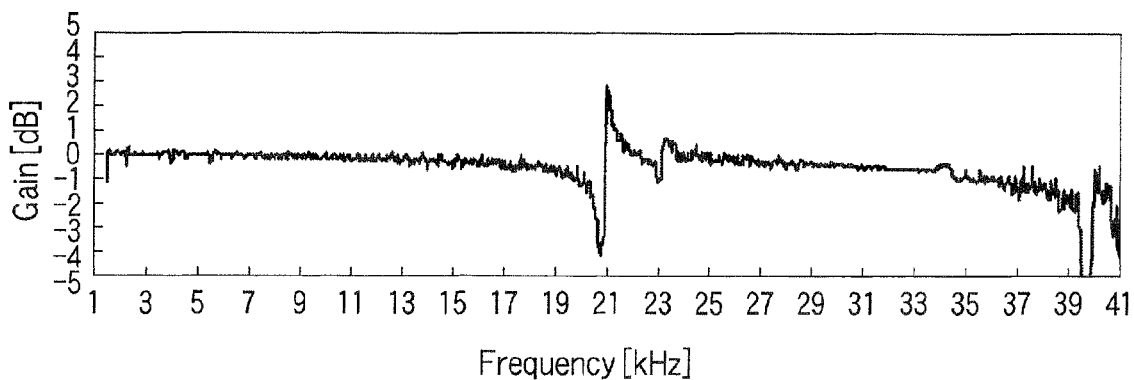
FIG. 10 is a diagram showing a frequency response characteristic of the mounting block shown in FIG. 9.

FIG. 9 shows a mounting block 40' of a first comparative example. The mounting block 40' is not provided with any adhesive member. The metallic mounting block 40' is in direct contact with a mounting surface 32 of a shaking section 30. Other configurations are the same as those of the first embodiment. FIG. 10 shows a frequency response characteristic of the mounting block 40', which includes a vibration mode near 21 kHz.

Figure 11:
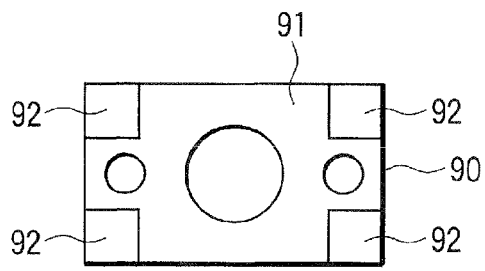
FIG. 11 is a rear view of a mounting block of a second comparative example.
Figure 12:
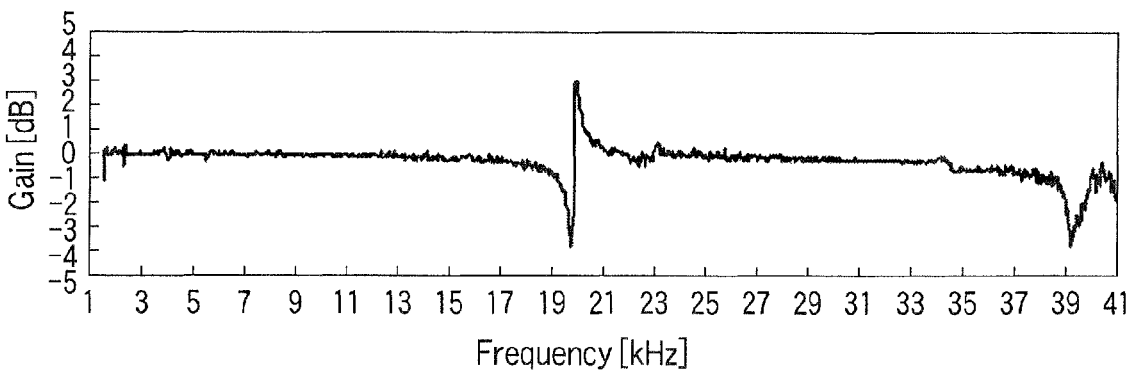
FIG. 12 is a diagram showing a frequency response characteristic of the mounting block shown in FIG. 11.

FIG. 11 shows a mounting block 90 of a second comparative example. Projections 92 of 50-μm height are formed at the four corners of a facing surface 91 of the mounting block 90 by machining. In this case, the metallic projections 92 directly contact a mounting surface 32 of a shaking section 30. Other configurations are the same as those of the first embodiment. FIG. 12 shows a frequency response characteristic of the mounting block 90, which includes a vibration mode near 20 kHz.

FIG. 13 shows a mounting block 100 of a third comparative example. Stainless-steel shims 102 of 15-μm thickness are located individually in two positions, left and right, on a facing surface 101 of the mounting block 100. The mounting block 100 is fixed to a mounting surface 32 with the shims 102 therebetween. Other configurations are the same as those of the first embodiment. FIG. 14 shows a frequency response characteristic of the mounting block 100, which includes vibration modes near 20 and 22 kHz.

FIG. 15 shows a mounting block 110 of a fourth comparative example. Two resin tapes 112 of polyimide with a thickness of 50 μm are disposed individually on upper and lower parts of a facing surface 111 of the mounting block 110. Other configurations are the same as those of the first embodiment. FIG. 16 shows a frequency response characteristic of the mounting block 110, which includes a vibration mode near a range from 16 to 21 kHz.

FIG. 17 shows a mounting block 120 of a fifth comparative example. Three resin tapes 112 of polyimide with a thickness of 50 μm are disposed on a facing surface 121 of the mounting block 120, one on one upper part thereof and the other two on two lower parts. Other configurations are the same as those of the first embodiment. FIG. 18 shows a frequency response characteristic of the mounting block 120, which indicates an extensively disturbed waveform.

FIG. 19 shows a mounting block 130 of a sixth comparative example. Two resin tapes 112 of polyimide with a thickness of 50 μm are disposed individually on two upper parts of a facing surface 131 of the mounting block 130. Other configurations are the same as those of the first embodiment. FIG. 20 shows a frequency response characteristic of the mounting block 130, which includes a vibration mode near 18 kHz.

Figure 21:
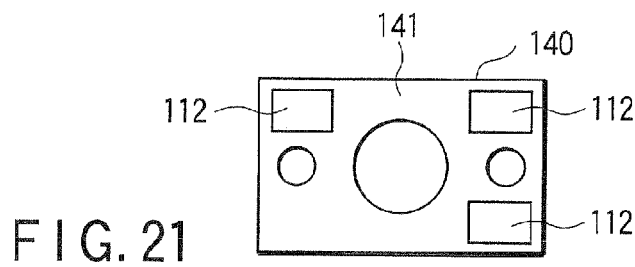
FIG. 21 is a rear view of a mounting block of a seventh comparative example.
Figure 22:
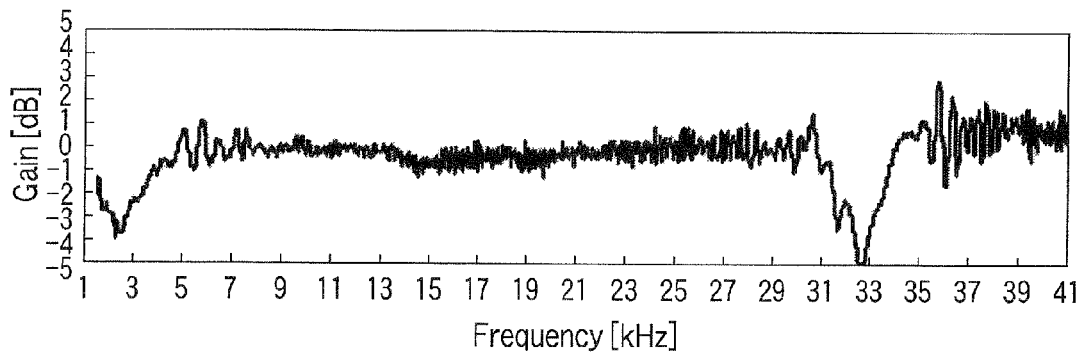
FIG. 22 is a diagram showing a frequency response characteristic of the mounting block shown in FIG. 21.

FIG. 21 shows a mounting block 140 of a seventh comparative example. Three resin tapes 112 of polyimide with a thickness of 50 μm are disposed on a facing surface 141 of the mounting block 140, one on one lower part thereof and the other two on two upper parts. Other configurations are the same as those of the first embodiment. FIG. 22 shows a frequency response characteristic of the mounting block 140, which indicates an extensively disturbed waveform.

Figure 23:
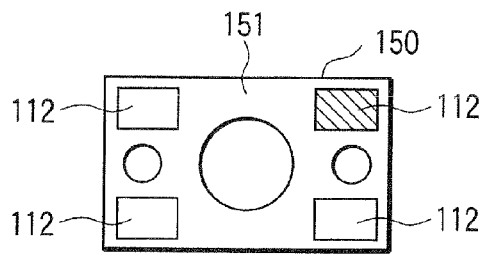
FIG. 23 is a rear view of a mounting block of an eighth comparative example.
Figure 24:
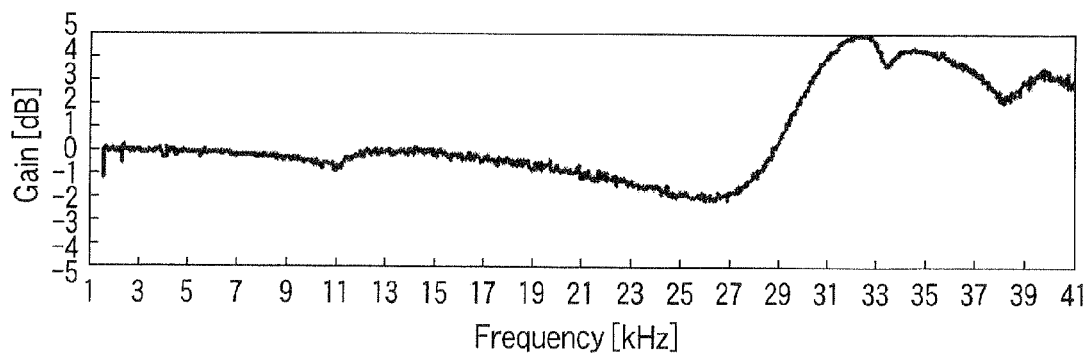
FIG. 24 is a diagram showing a frequency response characteristic of the mounting block shown in FIG. 23.

FIG. 23 shows a mounting block 150 of an eighth comparative example. Two superposed resin tapes 112 of polyimide with a thickness of 50 μm are disposed on one (hatched part) of the four corner parts of a facing surface 151 of the mounting block 150. One similar resin tape 112 is disposed on each of the remaining three corner parts. Other configurations are the same as those of the first embodiment. FIG. 24 shows a frequency response characteristic of the mounting block 150, which indicates an extensively disturbed waveform.

Based on the first to third embodiments of the invention and the first to eighth comparative examples described above, the knowledge was obtained that the following configuration is effective to suppress the appearance of the vibration mode of the mounting block 40 in the measured waveform. Specifically, the adhesive members 80 of a uniform thickness are disposed between the mounting surface 32 of the shaking section 30 and the facing surface 70 of the mounting block 40.

In addition, the adhesive members 80 are located with a good balance in the positions laterally and vertically symmetrical with respect to the through-hole 75 into which the male screw member 77 is inserted.

Alternatively, an adhesive member formed of an adhesive-coated resin tape may be disposed on the entire area of the facing surface 70 of the mounting block 40. Further, a material (e.g., viscoelastic material) that behaves substantially as a solid in a high-frequency range (e.g., 1 kHz or more) may be used for the adhesive members.

It was also found that the same effect can be obtained if the adhesive member 81 formed of oil, such as grease, is used in place of the tape-like adhesive members 80. However, oil cannot be neatly applied to the mounting surface 32 or the facing surface 70 with ease, and it may sometimes adhere to and soil surroundings of parts to be coated or operators' fingers. Thus, it is better to use the tape-like adhesive members 80.

It is to be understood, in carrying out the present invention, that the specific configurations, shapes, layouts, and the like of the mounting block, adhesive members, etc., as well as the shaker, may be changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vibration characteristic measuring device comprising:
   a shaker including a shaking section which reciprocates along an axis;
   a mounting block fastened along the axis to a mounting surface of the shaking section by a fixing member and including a workpiece mounting portion configured to be mounted with a disk drive suspension; and
   a sensor which detects a vibration of the suspension mounted on the workpiece mounting portion,
   wherein:
   the mounting block has a facing surface which includes four corners and which faces the mounting surface of the shaking section, and
   the measuring device comprises adhesive-coated resin tapes which are affixed to vicinities of the four corners of the facing surface, the resin tapes being deformable when sandwiched between the mounting surface and the facing surface and closely contacting both the mounting surface and the facing surface without a gap with the mounting block fastened to the mounting surface by the fixing member.

2. The vibration characteristic measuring device according to claim 1, wherein a through-hole extending along the axis opens in a center of the facing surface of the mounting block, a male screw member comprising the fixing member is inserted into the through-hole, and the mounting block is fastened to the mounting surface of the shaking section by the male screw member.

3. A vibration characteristic measuring device comprising:
   a shaker including a shaking section which reciprocates along an axis;
   a mounting block fastened along the axis to a mounting surface of the shaking section by a fixing member and including a workpiece mounting portion configured to be mounted with a disk drive suspension; and
   a sensor which detects a vibration of the suspension mounted on the workpiece mounting portion,
   wherein:
   the mounting block has a facing surface which includes four corners and which faces the mounting surface of the shaking section, and
   the measuring device comprises thermoplastic resin tapes which are fused to vicinities of the four corners of the facing surface, the resin tapes being deformable when sandwiched between the mounting surface and the facing surface and closely contacting both the mounting surface and the facing surface without a gap with the mounting block fastened to the mounting surface by the fixing member.

4. The vibration characteristic measuring device according to claim 3, wherein a through-hole extending along the axis opens in a center of the facing surface of the mounting block, a male screw member comprising the fixing member is inserted into the through-hole, and the mounting block is fastened to the mounting surface of the shaking section by the male screw member.

* * * * *